(12) United States Patent
Cramer

(10) Patent No.: US 7,254,980 B2
(45) Date of Patent: Aug. 14, 2007

(54) GAS SUPPLY TUBE AND METHOD OF MAKING SAME

(75) Inventor: Alfred Cramer, Sundern (DE)

(73) Assignee: Carl Froh GmbH, Sundern (DE)

( * ) Notice: Subject to any disclaimer, the term of this patent is extended or adjusted under 35 U.S.C. 154(b) by 427 days.

(21) Appl. No.: 10/834,393

(22) Filed: Apr. 28, 2004

(65) Prior Publication Data

US 2004/0262899 A1   Dec. 30, 2004

(30) Foreign Application Priority Data

May 5, 2003   (DE)   ................ 103 20 106

(51) Int. Cl.
*B21D 39/08*   (2006.01)
*B21D 51/16*   (2006.01)
*B21K 1/16*   (2006.01)

(52) U.S. Cl. ............... 72/370.07; 72/370.03; 72/370.04; 72/370.06; 72/370.08; 29/890.149

(58) Field of Classification Search ............ 72/370.1, 72/370.06, 370.03, 370.04, 370.07, 370.08; 29/890.149

See application file for complete search history.

(56) References Cited

U.S. PATENT DOCUMENTS

| | | | | |
|---|---|---|---|---|
| 1,993,361 A | * | 3/1935 | Cornell, Jr. | ................ 72/133 |
| 2,057,038 A | * | 10/1936 | Lindquist et al. | ........ 285/134.1 |
| 2,078,195 A | * | 4/1937 | Cornell, Jr. | ............ 29/890.149 |
| 2,183,271 A | * | 12/1939 | Wendel | ................ 285/289.5 |
| 2,831,523 A | * | 4/1958 | Wurzburger | ................ 72/133 |
| 3,303,680 A | * | 2/1967 | Thielsch | ................ 72/58 |
| 5,956,988 A | * | 9/1999 | Beste et al. | ................ 72/57 |
| 6,318,754 B1 | | 11/2001 | Einsiedel | |
| 6,530,256 B1 | * | 3/2003 | Irie et al. | ................ 72/370.1 |
| 6,631,923 B2 | | 10/2003 | Eckert | |
| 6,843,096 B2 | * | 1/2005 | Viegener et al. | ........ 72/370.03 |

* cited by examiner

*Primary Examiner*—James M. Hewitt
(74) *Attorney, Agent, or Firm*—Andrew Wilford

(57) ABSTRACT

A metal gas-feed tube for a head air bag automotive vehicle has a sleeve formed on a bent end thereof to fit onto a connecting fitting of a gas generator. That sleeve is formed in part from an unbent region of the tube by pressing a mandrel into the end of the tube which lies outside a die so that the rear end of the sleeve is formed from a bent portion while the free end is not subjected to bending deformation in the production of the bend.

3 Claims, 6 Drawing Sheets

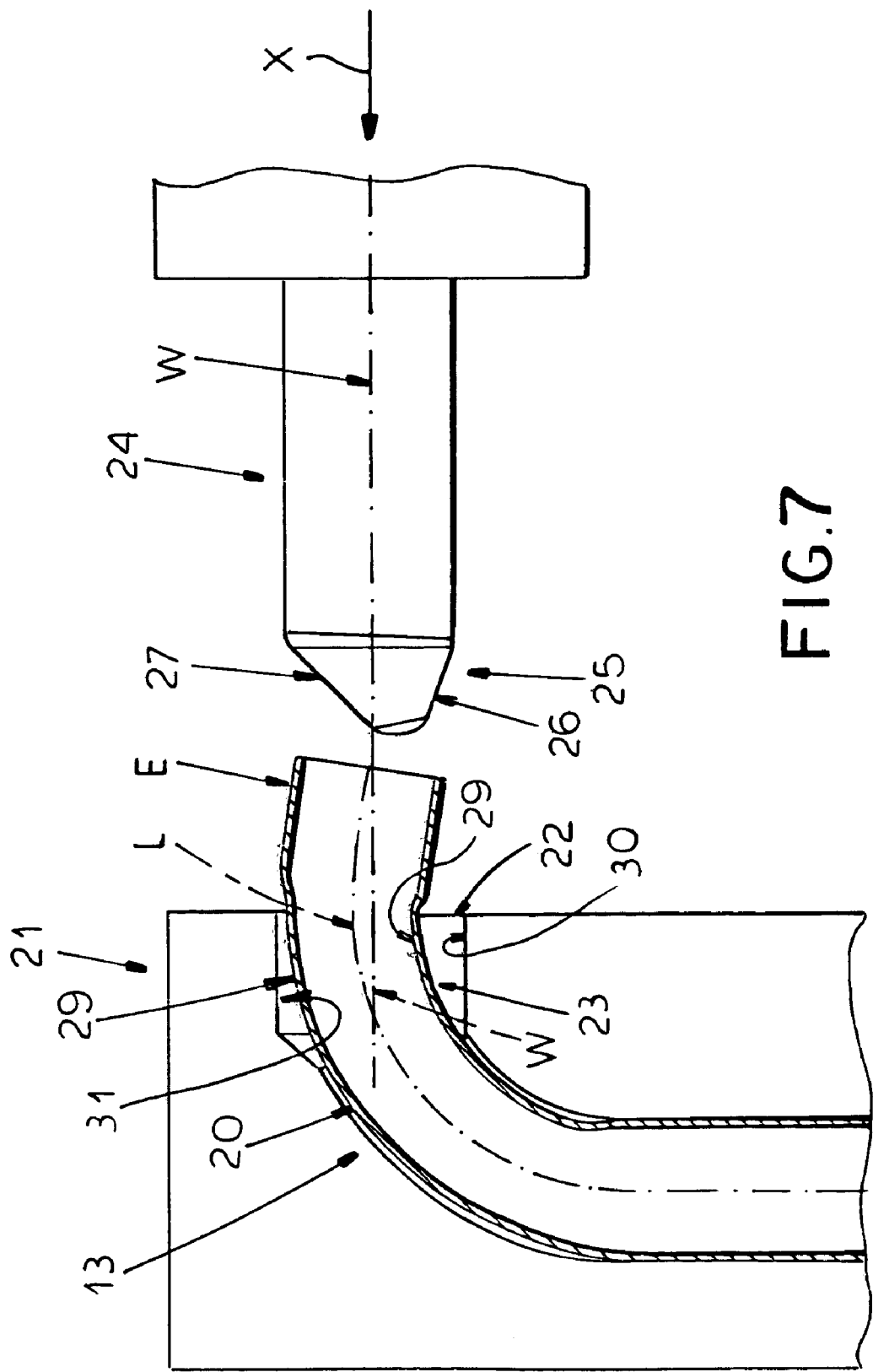

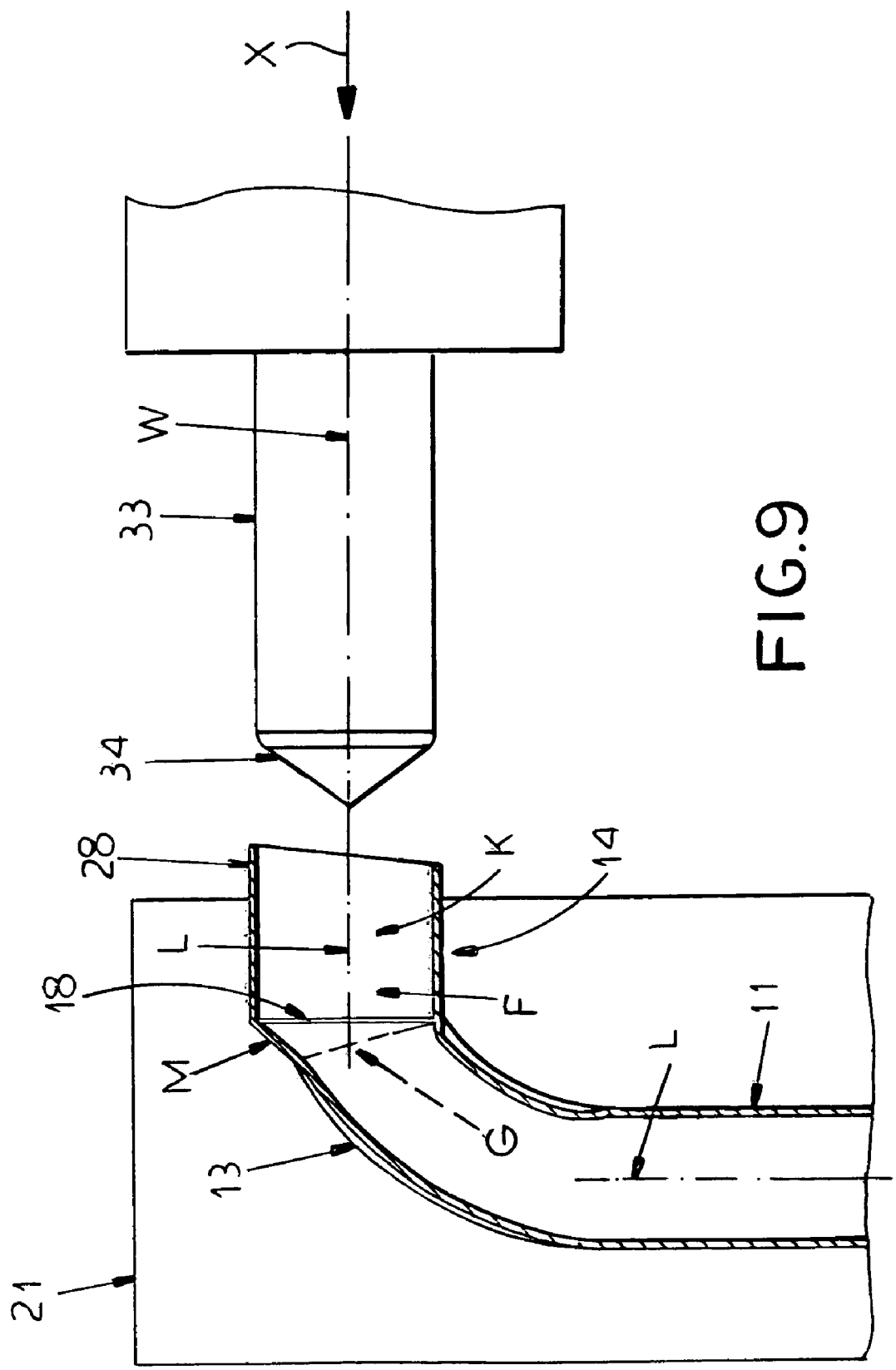

GAS SUPPLY TUBE AND METHOD OF MAKING SAME

FIELD OF THE INVENTION

My present invention relates to a gas supply tube of metal for the inflation of an air bag of an automotive vehicle and to a method of making that gas supply tube. More particularly the invention relates to the fabrication of a gas supply tube for an air bag adapter to be positioned in the head region.

BACKGROUND OF THE INVENTION

A bag supply tube of metal for head air bags in an automotive vehicle commonly have at least one end provided with a tube bend for elbows whose free extremity has a circularly cylindrical sleeve-like enlargement which is intended to fit over a connecting fitting, especially a fitting of a gas generator.

Such tubes have been used in practice and may be referred to as a gas lance, being employed to supply the gas to the head air bags of the vehicle. One end of the gas lance is usually closed while the other end is formed directly with the circularly cylindrical sleeve-like enlargement which fits sealingly onto the connecting fitting of a gas generator.

In earlier systems, to provide a sufficient seal and a connection which was to prevent axial shifting as a result of the gas pressure, the connecting fitting of the generator had an outwardly open annular groove in which a portion of the sleeve-like attachment engaged.

The circularly cylindrical sleeve-like enlargement was a component of a 90° tube bend. Since the vehicle generally has little space available to accommodate the air bag and the gas feeder therefor, it has been important to make that 90° tube bend as flat as possible so that the air bag system, as a whole, is comparatively compact. The need for a tight bend has created problems with earlier cold-forming techniques in the fabrication of such units since it was difficult with standard cold-forming approaches to make both a tight bend and a sleeve-like formation thereon. The result in some cases was that the steel of the tube was excessively stressed. The result of that stress was detrimental crack formation, especially of outer parts of the bend and folds at inner parts of the bend.

Accordingly in practice the tube end was initially given a 45° bend with a radius of Bay, 30 mm. The tube end was then subjected to enlargement and then the bend at the same radius of say 30 mm was extended into a 90° bend. In order to keep the bend relatively flat, two distinct bending regions were generally provided and were connected by a straight segment.

OBJECTS OF THE INVENTION

Starting from a system of the type described, it is the principal object of the present invention to so improve upon that gas supply tube that it can be fabricated by cold-forming far more easily-and with significantly fewer defects than has hitherto been the case in a particularly problem-free manner.

It is another object of this invention to provide a gas feed tube, especially for air bags of an automotive vehicle whereby the drawbacks of earlier metal and especially steel gas feed tubes can be obviated.

Still another object of this invention is to provide by cold-forming a gas feed tube with a circularly cylindrical sleeve-shaped enlargement which can engage over a connecting feeding of a gas generator in a gas-tight manner which resists axial displacement from that fitting.

Still another object of this invention is to provide an improved method of making such a metal gas supply tube which is simple and free from disadvantages of earlier cold-forming methods, especially with respect to the process which may be generated therein.

SUMMARY OF THE INVENTION

These objects are achieved with a metal gas supply tube having on at least one extremity a tube bend having a free front end formed with a circularly cylindrical socket-like enlargement adapted to receive a gas generator fitting and whereby the tube bend has a bending-deformed region adjacent a rear side of the circularly cylindrical socket-like enlargement, and wherein only a rear portion of the circularly cylindrical socket-like enlargement adjacent the rear side is shaped from a part of the bending-deformed region while a front portion of the circularly cylindrical socket-like enlargement adjacent the rear portion extending to the end is shaped from a bending-deformation-free part of the tube.

Preferably the rear side of the circularly cylindrical socket-like enlargement is formed with a transition region tapering toward the bending-deformed region and which forms a circular frustocone whose generatrices at an outer side of the tube bend are substantially longer than the generatrices at an inner side of the tube bend. The lengths of the generatrices at the inner side can approach zero, i.e. can be zero or close to zero.

Preferably the entire tube bend up to the enlargement has a constant and uniform curvature over its entire length.

The method of making the gas supply tube can comprise the steps of:

(a) forming a metal tube with a tube bend having a bending-deformed region adjacent a rear side of a circularly cylindrical socket-like enlargement extending to the free front end of the tube bend;

(b) inserting the tube bend into a correspondingly shaped cavity of a forming die so that the circularly cylindrical socket-like enlargement and a bending-deformation-free portion of the tube projects from the die and a bending-deformation portion of the tube adjacent bending-deformation-free portion lies within an enlargement of the cavity having an inner contour corresponding to an ultimate outer contour of the finished circularly cylindrical socket-like enlargement to be provided on the tube;

(c) forcing an enlarging tool into the free end and thereby forcing a rear portion of the enlargement-on the tube into the enlargement of the cavity and shaping the rear portion to the contour while a front portion of the enlargement on the tube remains outside the cavity and the die; and (d) thereafter completing the shaping and sizing of the enlargement on the tube by forcing a calibrating mandrel into the free end whereby only the rear portion of the circularly cylindrical socket-like enlargement adjacent the rear side is shaped from a part of the bending-deformed region while a front portion of the circularly cylindrical socket-like enlargement adjacent the rear portion extending to the end is shaped from a bending-deformation-free part of the tube.

When a 90° bend is to be formed ultimately in the tube, the extremity can initially be bent into an angle in excess of 90°, preferably about 97°.

According to the invention, therefore, the extremity provided with the circularly cylindrical sleeve-shaped enlargement is a portion of the tube which is free from the bend and thus is a bend-deformation-free tube region at least at the front of that enlargement. The rear of that enlargement can, of course, be formed from a portion of the tube which has been deformed into the bend.

In accordance with the invention, in the production of the tube bend, the cold-forming action is subdivided into at least two parts. Initially in the bend-deformation, a free extremity of the tube is left without a previous bend deformation at least until after the circular cylindrical enlargement has been deformed therein.

As a consequence in the region of the bend, the cold deformation which results in the formation of the mouth of the enlargement does not contribute to cold hardening of the rear portion of the enlargement and thus its junction with the bend nor is that free end subjected to the cold hardening which results from the bend formation. The widening of the tube for producing the circularly cylindrical sleeve formation acts only on a limited front portion which remains unaffected by the bend formation so that this widening is uneffected by cold hardening and thus can be carried out without crack or fold formation and substantially entirely to the finished dimensions.

According to a feature of the invention, at the rear side of the enlargement, i.e. at its transition to the bend, a circular frustoconical configuration is produced whose generatrices on the outer side of the tube bend are substantially longer than the generatrices on the inner side can be zero or approximately zero.

According to the invention, the bend extends uniformly over its entire length, rather than being subdivided into two bent regions as in the earlier systems described in which there is a straight portion between those bent regions.

BRIEF DESCRIPTION OF THE DRAWING

The above and other objects, features, and advantages will become more readily apparent from the following description, reference being made to the accompanying drawing in which:

FIGS. 7-9 are longitudinal sections showing three stages in the manufacture of the tube according to the invention and the tool utilized for these three stages.

SPECIFIC DESCRIPTION

Figure 1:
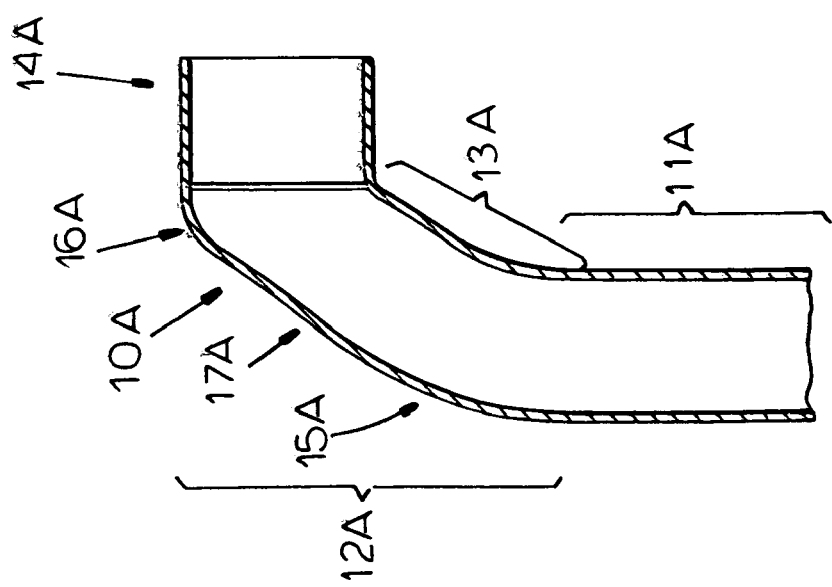
FIG. 1 is a cross sectional view of an end segment of a gas lance having a tube 2 formed with two bent sections with a straight section between them in accordance with the prior art.

In FIG. 1, I have shown the prior art tube or gas lance described previously and comprising two bent segments with a straight section between them. The gas supply tube or gas lance 10A of FIG. 1, is shown only at its front end, the portion broken away being connected with the air bag and having filling or gill-like openings for that purpose.

At the end to be connected to a gas generator (not shown), a straight tube portion 11A communicates with a tube bend shown overall at 12A and which comprises a bent region 13A terminating in a circularly cylindrical sleeve-like enlargement 14A. The sleeve-like enlargement 14A can be fitted onto a connecting pipe or fitting of a gas generator and can be secured by forcing it into a corrugation-shaped groove thereof.

The bent region 13A is comprised of two partial bends 15A and 16A and a straight region 17A between them.

Figure 2:
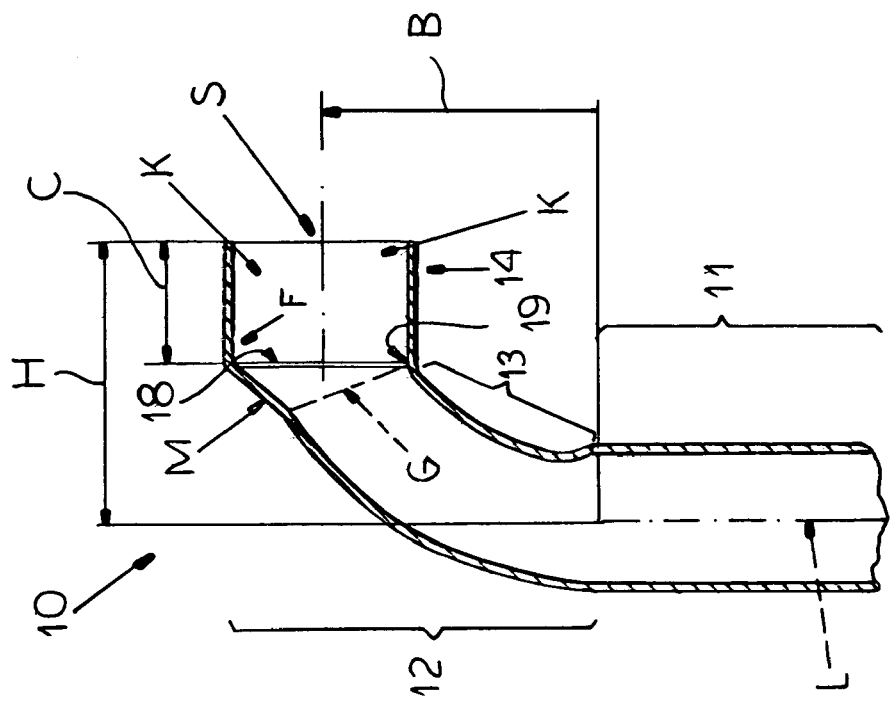
FIG. 2 is a longitudinal section similar to FIG. 1 but showing the extremity of a gas supply tube of metal for the head air bag of a motor vehicle.

By contrast, the tube 10 of FIG. 2, according to the invention, has a bend or elbow 12 formed on the straight tube region 11 and comprising a uniformly curved bent region 13 terminating in the circularly cylindrical sleeve or enlargement 14. From FIG. 2 it also can be seen that the tube bend region 13 is formed during the bending process with a slightly constricted segment.

Between the rear side 18 of the enlargement 14 and the remainder of the tube bend (as bounded by the broken line G), there is a transition region which converges toward the tube bend and has the shape of a circular frustocone. On the outer periphery the generatrices M are substantially longer at the inner periphery at which the generatrices may have zero length.

To produce a compact structure it is important that the height H, that is the spacing of the end S of he sleeve-like enlargement 14 from the tube axis L as well, finally as the spacing D which represents the width of the bend 12 is not exceeded. It is also important that the axial length C of the circularly cylindrical sleeve-like enlargement 14 have a minimum dimension so that a sufficient plug-in length will be created for. receiving the connecting fitting, not shown in the, drawing, of a gas generator.

In the production of the gas feed tube 10, it is important that in the region of the generatrices M at the outer part of the tube bend, no cracks develop and that in the region indicated at 19 at the inner bend of the tube, no folds arise.

The method of producing the gas feed tube 10 will be described in connection with FIGS. 3-9.

Figure 3:
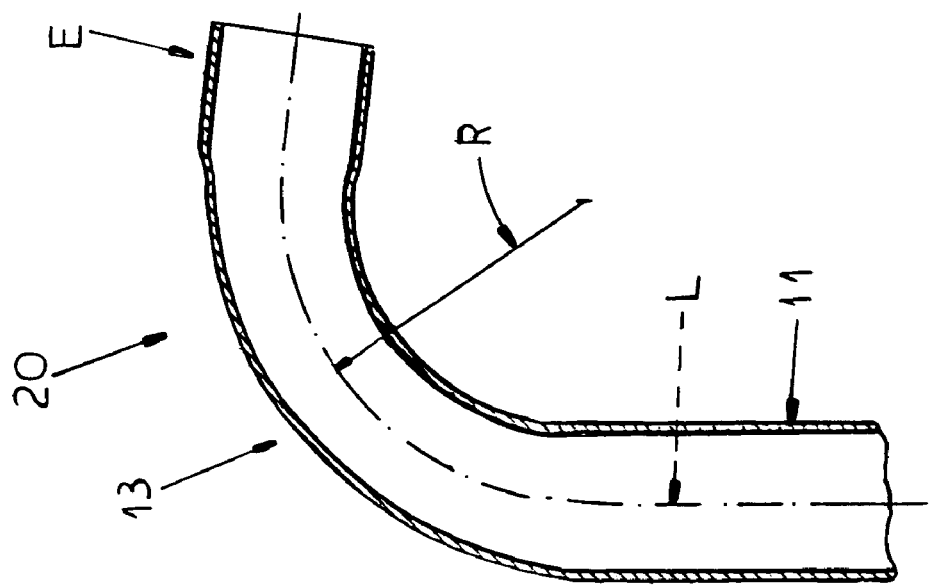

According to FIG. 3, with the aid of a bending device which has not been shown, a bend tube end 20 is produced with a radius R of for example 30 mm, which consists of a tube end region 13 in which there is a slight bending constriction and a nondeformed, that is bend-deformation-free, front-free end region E.

The bend-deformation-free front free end region E has a somewhat larger diameter than the remaining tube bend region 13 which depending upon the bending process results in a bending and stretching loading of the tube, a slight bending constriction or a diameter reduction. The bending deformation is carried out with the radius of about 30 nm and a circumferential angle of about 97°.

According to FIG. 7 the arc-shaped tube end 20 is then placed in a female die 21 so that the front free end region E which is the bending deformation-free tube region, lies outside the die 21. At the die opening 22, the rear end of the enlargement 23 is located and which, after complete deformation of the cold formable steel constituting the tube workpiece 20, the cylindrical sleeve-shaped enlargement 14 according to FIG. 2 is formed.

Figure 8:
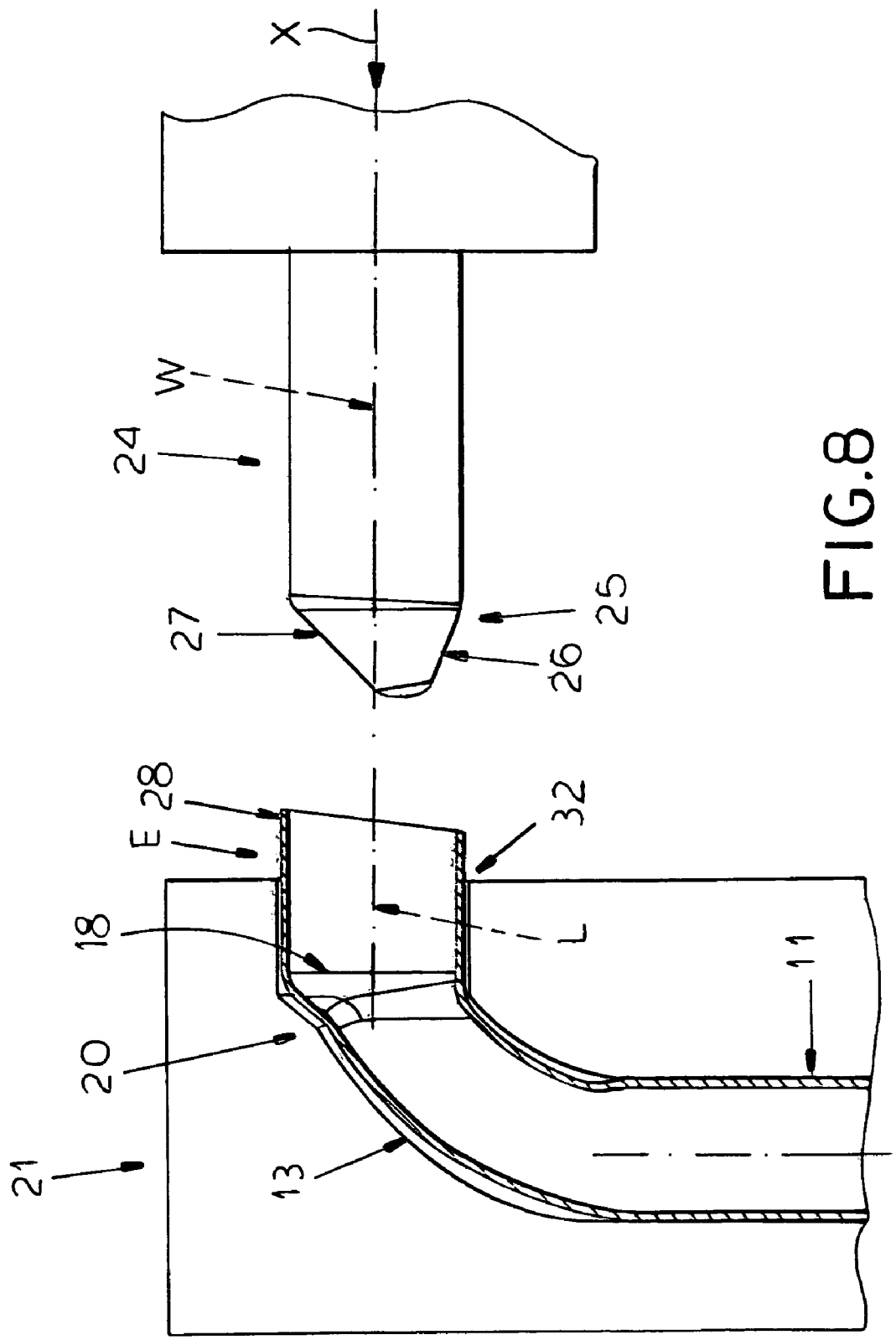

From FIG. 7, a spreading mandrel 24, constituting an internal tool, is visible. The front region of this tool is formed with an acute angle circular cone with a flattened or rounded tip and whose lower regeneratrices according to FIGS. 7 and 8, can be substantially shorter than the upper generatrices 27. The widening mandrel 24 is inserted into the open end region E of the bent deep end 20, that it is forced into it and following its deformation is again withdrawn as FIG. 8 illustrates. The mandrel 24 thus moves back and forth along the straight path W which lies beneath the tube axis L as seen in FIG. 7 for the die enlargement.

In the transition from the finishing step according to FIG. 7 to the finishing step of FIG. 8, the following should be noted:

The front free end region E is-pressed back into the die except for the region 28 remaining outside the die and is increased in width to conform to the die recess. In this case, the front free end region E, together with the region 29 of the back portion of the sleeve bordering the free end region and extending to the remainder of the bend 13 and previously subjected to bending deformation are widened to the configuration of the interior 30 of the die and lie against the inner wall thereof.

At the same time the front free end region E and the adjoining region 29 which had been subjected to bending and is connected to the remainder 13 of the tube bend is pressed on the other side against the outer side 31 of the die recess.

Figure 4:
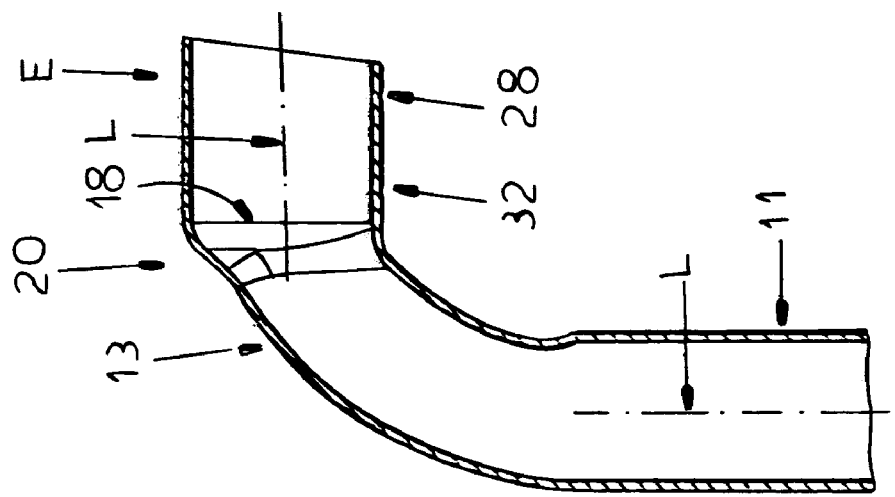
FIGS. 3-6 are longitudinal sections similar to FIG. 2 showing successive stages in the formation of the enlargement at the end of a tube bend according to the invention.

The result is the preliminary shape 32 imparted to the enlargement 14 as illustrated in FIGS. 4 and 8.

Figure 5:
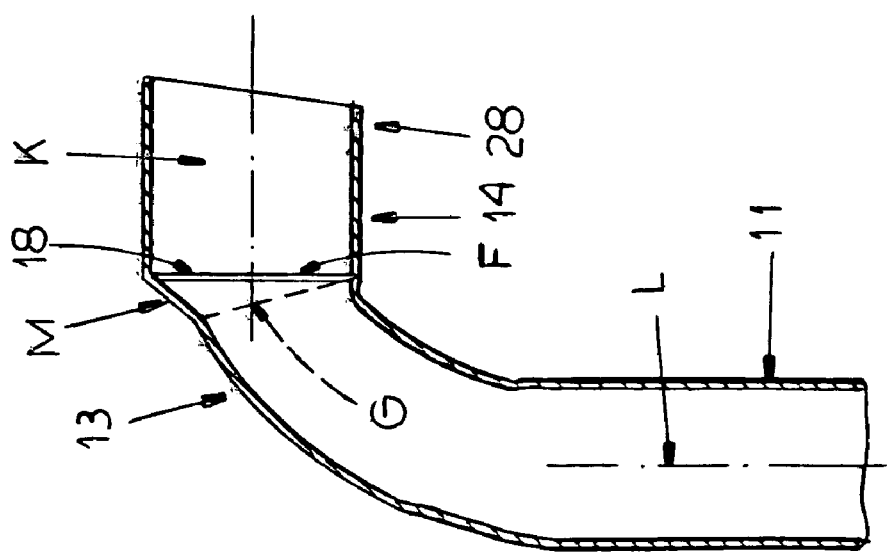

The preliminary shape 32 can be sized by a calibrating mandrel 33 which has a uniform conical tip 34 and which provides the final sleeve-like configuration to the enlargement 14 as shown in FIG. 9 (compare FIG. 5).

Figure 6:
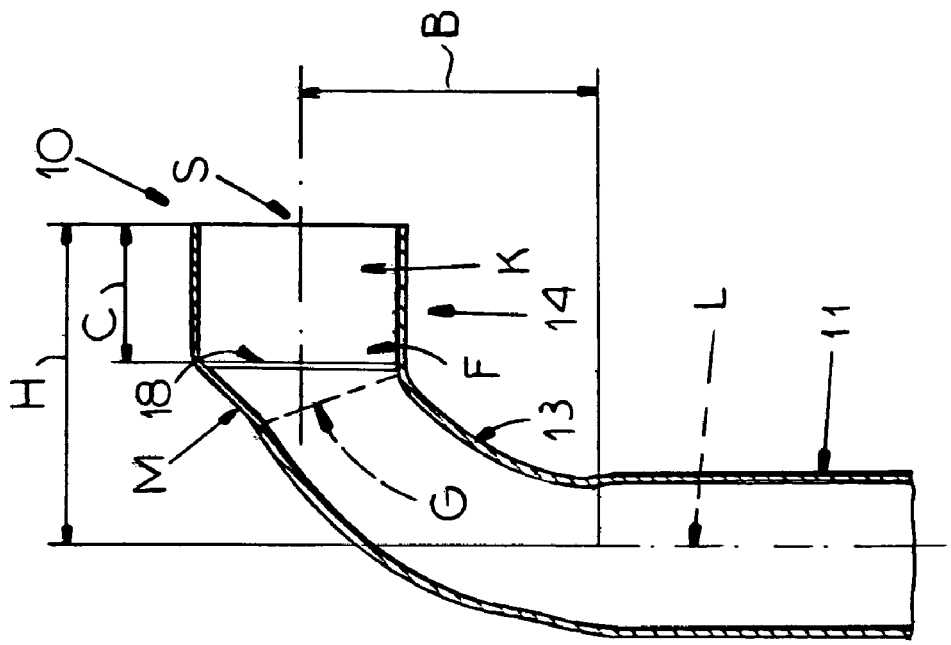

From FIGS. 2 and 6 it can be appreciated that the circularly cylindrical sleeve-like enlargement has a back end region F which is formed from the tube bend and has been subjected to bending deformation. By contrast, the front region K of the sleeve 14 is a component reshaped from the front end region E, which was free from the bending deformation.

FIG. 9 shows the finished stage following the calibration or sizing. In FIGS. 9 and 5 the circularly cylindrical sleeve-like enlargement 14 has the region 28 which is finally trimmed so that the final configuration according to FIGS. 2 and 6 will result.

I claim:

1. A method of making a metal gas supply tube, said method comprising the steps of:
   (a) forming an extremity of a metal tube with a bending-deformed bent region adjacent a rear side of a bending-deformation-free front free end region of the tube;
   (b) inserting said tube into a correspondingly shaped cavity of a forming die so that said front free end region projects from said and an adjoining region of the bending-deformed bent region of said tube extends forward into an enlargement of the cavity having an inner contour corresponding to an ultimate outer contour of a finished circularly cylindrical socket-like enlargement to be provided on said tube;
   (c) forcing an enlarging tool into said free front end region and thereby forcing the adjoining region into said enlargement of said cavity and shaping said adjoining region to said inner contour while a front portion of said tube remains outside said cavity of said die; and
   (d) thereafter completing the shaping and sizing of said tube by forcing a calibrating mandrel into said front free end region such that only a back end region of said finished circularly cylindrical socket-like enlargement is shaped from a part of the bending-deformed bent region while a front region of said finished circularly cylindrical socket-like enlargement extending from said back end region to said front free end region is shaped from the bending-deformation-free front free end rsegion of the tube.

2. The method of making the metal gas supply tube defined in claim 1 wherein, for producing a 90° bend in said tube, said extremity is bent through an angle in excess of 90°.

3. The method defined in claim 2 wherein said extremity is bent through an angle of about 97°.

* * * * *